Aug. 29, 1944.  R. C. MAGEE  2,356,772
AIRCRAFT PROPELLER
Filed June 7, 1943  4 Sheets-Sheet 3

INVENTOR
ROBERT C. MAGEE

Patented Aug. 29, 1944

2,356,772

UNITED STATES PATENT OFFICE 2,356,772

AIRCRAFT PROPELLER

Robert C. Magee, Dayton, Ohio

Application June 7, 1943, Serial No. 489,945

29 Claims. (Cl. 170—163)

(Granted under the act of March 3, 1883, as amended April 30, 1928; 370 O. G. 757)

The invention described herein may be manufactured and used by or for the Government for governmental purposes, without the payment to me of any royalty thereon.

This invention relates to aircraft propellers, and particularly, to mechanism by which the blade pitch may be automatically controlled, the mechanism being of that type wherein power for making changes in the blade pitch is derived from the aircraft engine itself.

The function of a variable pitch propeller is to maintain, for any given engine torque, a constant engine speed, irrespective of flight attitude or air density. Whenever, therefore, for a given engine torque, the revolution speed of the engine is too low for best efficiency, the blade angle is decreased to allow the engine to speed up, and whenever, for a given engine torque, the revolution speed of the engine is too high for best efficiency, the blade angle is increased to bring the speed of the engine down to normal for that torque.

It is, therefore, an object of this invention to provide effective, but inexpensive, mechanism, which will sense the need for a change in blade angle, measure the amount of the change, and automatically make the necessary change without the attention of the pilot.

Mechanisms heretofore used or proposed for this purpose usually contain a large number of toothed gears, which are not only costly, but add considerable weight to the aircraft in which they are used. The need for such a large number of gears is partly due to the great amount of speed reduction required between the driving and the driven elements of the gear train used to effect the change at the low rate of pitch change desired.

It is, therefore, another object of the invention to provide a device having a minimum of toothed gears, the other necessary parts being few in number and light in weight, and yet such as to provide as low a rate of pitch change as is practicable.

In normal level flight, the necessary changes in pitch angle from one moment to the next are usually very slight, so that a mechanism which will respond fast enough to change pitch at the rate of several degrees per second is usually quite satisfactory for this purpose, yet many occasions arise where a sudden change in flight attitude or in air density may require so considerable a change in blade angle that it is highly desirable to change to the new angle at a much faster rate.

It is, therefore, another object of this invention to provide mechanism which will sense not only an off-speed condition, but the magnitude of the off-speed condition, whereby a relatively low rate of pitch change will be had when the amount of the change required is small, and an appropriately higher rate of change will be had when the amount of the change is large, with an infinite number of intermediate rates of pitch change which vary by infinitesimal increment between the low and the high.

Other objects and advantageous features will become apparent as the accompanying description is read and reference is made to the drawings, wherein.

Like reference characters refer to like parts throughout the several views.

Figures 1, 10:
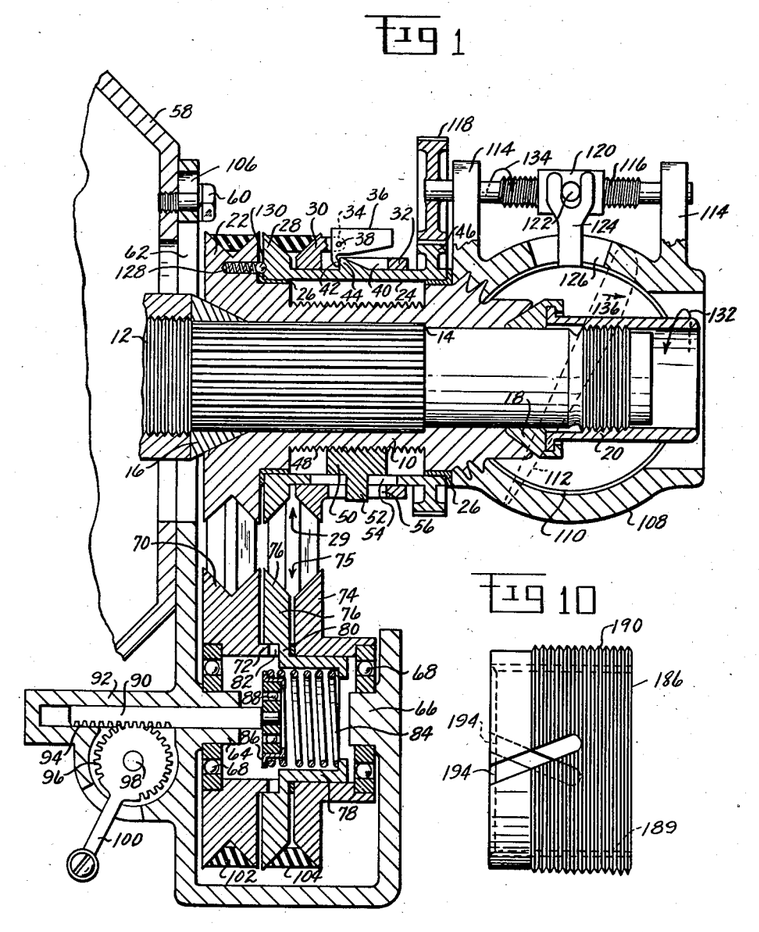
Fig. 1 is a vertical axial section through an aircraft propeller which embodies the principles of the invention.
Fig. 10 is a plan view of a detailed portion of the mechanism shown in Fig. 9.

In the vertical axial cross section, Fig. 1, a propeller hub 10 is drivably secured to the shaft 12 by splines 14, rear cone 16, front cone 18 and retaining nut 20.

Integral with, but permissibly otherwise secured to, the hub 10 is a V belt-pulley 22. A sleeve 24, having bearing means 26 at its ends, is freely rotatable on the outside of the propeller hub 10. Sleeve 24, at the rear end, carries one part 28 of a V belt-pulley, the other part 30 of the pulley having a forwardly extending hub 32 which is slidable axially on the outside of the sleeve 24. Pulley parts 28 and 30, when assembled, as shown, will compose a single pulley, which may conveniently be referred to as the pulley 29, and the several parts 24, 32, etc., which carry the pulley 29 may be referred to as a control means since their rotation relative to the propeller hub 10 controls pitch change of the blades.

Pulley part 30 has a series of circumferentially spaced pairs of hinge ears 34 between which centrifugally operable weights 36 are swingable on the hinge pins 38. Hub 32 is provided with a series of appropriately spaced slots 40 into which fingers 42 extend from the weights 36 inwardly, and lugs 44, for the fingers 42 to engage, extend from the sleeve 24 outwardly, whereby outward movement of the body of the weights 36 will create relative axial movement between parts 30 and 28 of the pulley 29. By this means, the diameter of the belt-engaging V of the pulley is adjusted. The lugs 44 act also as keys for preventing relative rotation between part 28 and part 30 of the pulley. Inasmuch as the pulleys 22 and 29 are on the propeller hub, and normally rotate at propeller hub speed, the two pulleys may conveniently be referred to hereinafter as the propeller hub pulleys. A gear 46 is fast on the sleeve 24 for unitary rotation with the pulley 29.

The propeller hub 10 is reduced in diameter at its middle portion and provided with external threads 48 into which the internal threads of the half-nut 50 are fitted. The outside diameter of the half-nut 50 is preferably fitted relatively close to the bore of the sleeve 24 to keep the internal threads of the half-nut in mesh with the external threads 48. One or more keys 52, fast on the half-nut 50, extend outwardly through slots 54 and 56 in the sleeve 24 and hub 32 respectively. Slot 56 is shorter than slot 54, whereby axial movement of the half-nut 50 will cause contact of the key 52 with the ends of the slot 56 to move the pulley part 30 endwise with respect to the pulley part 28. When the pulley 29 is, by this means, brought to the same diameter as the pulley 22, no further pitch change will take place.

Mounted on the nose of the engine 58 by bolts 60, is a pulley housing 62. Hubs 64 and 66, extending inwardly from the walls of the housing, each carry the inner race of an anti-friction bearing 68. A V belt-pulley 70 is fast on a forwardly extending sleeve 72 which has an integral, or otherwise drivably attached, pulley part 74, the other part 76 of this pulley being axially slidable on the hub 72 of the pulley 70. Pulley parts 74 and 76, when assembled as shown, will compose a single pulley which may conveniently be referred to as the pulley 75. Since the sleeve or hollow shaft 72 is rotatable on bearings 68, it may be considered a countershaft, and since the pulleys 70 and 75 are both carried thereon for unitary rotation therewith, the two pulleys may conveniently be referred to as the countershaft pulleys. A spring holder 78, slidable axially in the bore of the hub 72 is connected to the pulley part 76 by spokes 80 which extend through slots 82 in the hub 72, whereby the pulley part 76, spokes 80 and spring holder 78 are movable axially as a unit. This axial movement of the parts 74 and 76 with respect to each other varies the diameter of the V of the pulley 75. The spokes 80, being in slots 82, prevent relative rotation between the parts 76—78 and the ports 70—74.

A speed regulating spring 84 is held under an initial stress between the inturned end of the holder 78 and the flange of the cup 86 which supports the outer race of the bearing 88. The inner race of the bearing 88 is carried on the end of a rod 90 which is slidable in a hub 92 of the housing 62. Rod 90 has a series of rack teeth 94 along one edge with which the teeth of the gear 96 mesh. A speed control arm 100 extends from the gear 96, whereby the gear 96 may be rotated on its stud 98 to move the rod 90 axially to vary the stress of the spring 84. The stud 98 is supported in the housing 62. Suitable connections (not shown) may be provided for remote control of the arm 100.

A V belt 102 encircles the pulleys 22 and 70 and a second V belt 104 encircles the pulleys 29 and 75. Belts 102 and 104 are identical but are assigned different numbers to facilitate subsequent description of their operation. The pulley housing 62 is provided with slots 106 for the mounting bolts 60 which hold the housing to the nose of the engine. By loosening the bolts 60, the housing may be moved downward whereby any slack in the belts will be taken up.

It should be noted that any outward swinging of the weights 36 will move the pulley part 30 to the left which will increase the V diameter of the pulley 29. Since the belt 104 is made of material having substantially no elongation under normal load, it will spread the parts 74 and 76 of pulley 75, against the resistance of the spring 84, and thereby decrease the V diameter of the pulley 75, whereupon the pulley 75 is smaller than the pulley 29, and the one to one ratio between these pulleys is disturbed. Similarly, if the spring 84 overrides the weights 36, the V diameter of the pulley 75 increases, and that of the pulley 29 decreases.

Carried on the front end of the propeller hub 10 and preferably integral therewith, are the usual laterally extending bosses 108 within which the shanks 110 of the propeller blades 112 have rotative bearing. Bearing brackets 114 extend laterally from each boss and rotatably support a blade-adjusting screw 116. A gear 118 on the rear end of the screw meshes with the gear 46 on the front end of the sleeve 24.

A nut 120 is internally threaded to fit the screw 116 and has a pin 122 extending from one flat side. An arm 124 extends radially from a blade shank 110, the arm being bifurcated at the outer end to straddle the pin 122. The arm 124 extends through a slot 126 in the boss 108. Obviously, gain or loss in speed of the pulley 29 with respect to the pulley 22 will rotate the screw 116 in one direction or the other which will rotate the blade 112 on its axis in one direction or the other.

Since the torque, which in flight, tends to rotate the propeller blade about its own axis to the minimum pitch angle, is of considerable magnitude, there is danger that this torque might, under the vibration to which the device is subject, act through the arm 124 and nut 122 to turn the screw 116, whereby the pulley 29 would move with respect to the pulley 22, and the pitch be changed when no pitch change was needed.

In order to anticipate the foregoing possibility and prevent its occurrence, the inner face of the pulley 22 may be drilled for a detent spring 128 and ball 130, the ball being thus urged into some one of a series of shallow indentations in the adjacent face of the pulley part 28. It will be apparent that, while a very slight torque applied to the pulley 29 will overcome the spring 28 and move the pulley 29 with respect to the pulley 22, a very great torque may be applied to the blade 112 without turning the pulley 29 with respect to the pulley 22, against the resistance of the spring and ball detent. The detent, therefore, allows substantially unrestricted turning of the blade 112 by the pulley 29, but prevents turning of the pulley 29 by the blade 112, since, in the latter case, a very slight resistance only is required.

Figure 3:
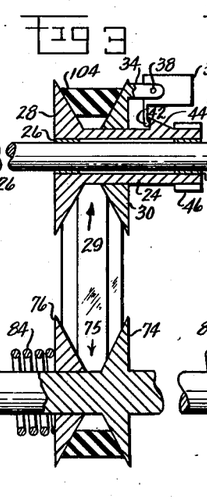
Fig. 3 is a schematic view of certain parts of the mechanism of Fig. 1 showing the condition of the parts when the propeller is "on speed,"

To facilitate an understanding of the operation of the described mechanism, it may be assumed that all four of the pulleys 22, 70, 75 and 29 are of equal diameter measured over the V track when the weights 36 have swung out to the intermediate position shown in Figs. 1 and 3. It should be understood, however, that the diameters of the several pulleys are not critical, it being required only that, with the weights in the intermediate position, there be a one to one ratio between pulleys 22 and 29 when 29 is driven by 22 through the belts 102 and 104 and the pulleys 70 and 75.

Figure 2:
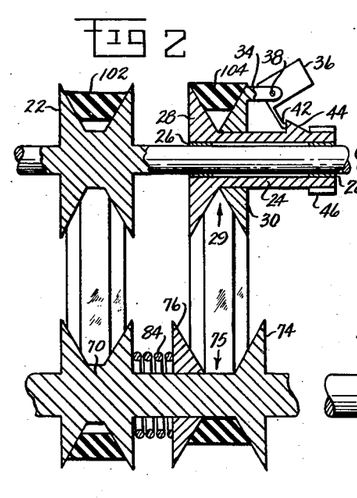
Fig. 2 is a schematic view of certain parts of the mechanism of Fig. 1 showing the condition of the parts when the propeller is overspeed.

The revolution speed at which the weights 36 will reach their intermediate position, Figs. 1 and 3, will depend, of course, on the stress of the spring 84. In Fig. 1, this spring is shown as being about midway between its greatest and its least stresses. Assume, for purposes of description only, that propeller shaft rotation is in the direction of the arrow 132, and that the weights 36 and the spring 84 are in such relative proportion that the weights 36 will have moved outward to the position shown in Figs. 1 and 3 at a predetermined R. P. M. of the propeller shaft 12. If, for any reason, such as the striking of a pocket of air of lesser density, or a change from a climbing to a diving attitude, the load on the blades 112 now decreases, the propeller speed will increase above the predetermined R. P. M. Responsive to the increase in propeller speed, the weights 36 will first swing out toward the position shown in Fig. 2, which will enlarge the pulley 29 and spread the parts 74—76 to make the pulley 75 smaller. This change in the pulley diameters will bring the speed of the pulley 29 down below that of the pulley 22, whereby the rotation of the pulley 29, relative to the pulley 22, is in a direction opposite the arrow 132. This will rotate the screw 116 in the direction of the arrow 134. The screw, being left hand, will rotate the blade 112 in the direc ion of the arrow 136, which increases the pitch and brings the pulley 22 back down to speed. The resulting decrease in speed of the pulley 29 brings the weights back from an overspeed condition similar to that shown in Fig. 2 at which the weights return to their normal position of Fig. 1 or 3.

Figure 4:
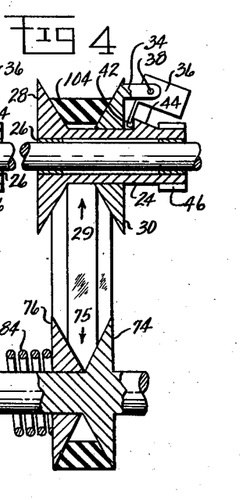
Fig. 4 is a schematic view of certain parts of the mechanism of Fig. 1, showing the condition of the parts when the propeller is underspeed.

On the other hand, if the load on the blades 112 increases, as when the plane encounters atmosphere of greater density, the propeller speed, and that of the pulley 22 with it, will decrease, the speed of the pulley 29 and weights 36 will at first decrease with the propeller, but the lowering of the speed of the weight 36, which causes it to move in a direction approaching the position shown in Fig. 4, will move the pulley part 30 in a direction to reduce the V diameter of the pulley 29, whereupon the pulley 29 will rotate faster than the pulley 22, and this difference in speed will turn the screw 116 opposite the direction of the arrow 134, which will decrease the propeller pitch and allow the propeller to come back up to speed.

It should be noted that when a change in the diameter of a V belt-pulley is herein mentioned, the change in diameter referred to is not necessarily a change in the actual diameter of any member of the pulley, but rather a change in the diameter of the track which the belt assumes on the pulley. In this connection, it should be understood that any belt-pulley, the belt track of which is adjustable to different diameters, is intended to come within the scope of this invention.

In the modification shown in Figs. 5 to 8, inclusive, the propeller hub 10 is drivably secured to the shaft 12 by splines 14, rear cone 16, front cone 18, and retaining nut 20.

Figure 5:
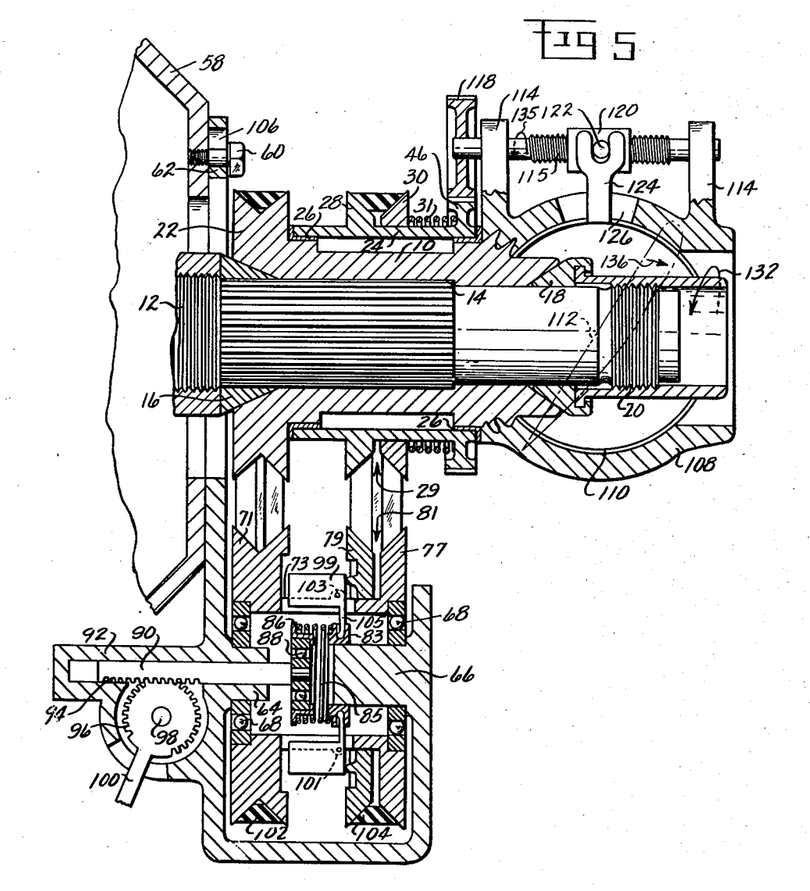
Fig. 5 is a vertical axial section through a modified form of the invention.

Secured to the hub 10 is a V belt-pulley 22. A sleeve 24, having a bearing means 26, is freely rotatable on the outside of the propeller hub 10. Sleeve 24, intermediate its ends, carries the one half 28 of the V belt-pulley, the other half 30 of the pulley being axially slidable over the hub 24. Pulley halves 28 and 30, when assembled as shown in Fig. 5, will compose a single pulley, which may conveniently be referred to as the pulley 29. Since the pulleys 22 and 29 are on the propeller hub, and normally rotate at propeller hub speed, the two pulleys may preferably be hereinafter designated the propeller hub pulleys.

A gear 46 is fast on the sleeve 24 for unitary rotation with the pulley 29. A spring 31 is held in compression between the gear 46 and the pulley part 30, whereby the part 30 is urged toward the part 28 to increase the V diameter over the pulley 29. No provision is made in the modification shown in Fig. 5 for limiting the number of turns which the pulley 29 may gain or lose with respect to the pulley 22 to thereby limit pitch change since the same mechanism provided for limiting pitch change in Fig. 1 may readily be adapted to the mechanism shown in Fig. 5.

Mounted on the nose of the engine 58 by bolts 60 is a pulley housing 62, hubs 64 and 66 extending inwardly from the walls of the housing, each carrying the inner race of an anti-friction bearing 68. A V belt-pulley 71 has a forwardly extending hub 73 which has an integral, or otherwise drivably attached, pulley part 77, the other part 79 of this pulley being axially slidable on the hub 73 of the pulley 71. Pulley parts 77 and 79, when assembled as shown in Fig. 5, will compose a single pulley which may be conveniently referred to as the pulley 81. Since the sleeve or hollow shaft 73 is rotatable on bearings 68, it may be considered a countershaft with the two pulleys 71 and 81 carried thereon and rotatable in unison therewith. The two pulleys 71 and 81 may therefore be hereinafter designated the countershaft pulleys. A spring-compressing collar 83, slidable axially on the hub 66, provides one abutment for a spring 85, the other end of the spring reacting against a cup 86 into which the outer race of an anti-friction bearing 88 is fitted. The inner race of the bearing 88 is carried on the end of a rod 90 which is slidable in the hub 92 of the housing 62. Rod 90 has a series of rack teeth 94 along one edge with which the teeth of the gear 96 mesh. A speed control arm 100 extends from the gear 96 whereby the gear 96 may be rotated on its stud 98 to move the rod 90 axially to vary the stress of the spring 85. Centrifugal weights 99 are hinged on ears 101, which project outwardly from the hub 73, by hinge pins 103. Arms 105 extend inwardly from the weights 99 into an annular groove in the collar 83, whereby outward swinging of the weights 99 moves the collar 83 axially on the hub 66 to vary the tension of the spring 85.

A V belt 102 encircles the pulleys 22 and 71, and a second V belt 104 encircles the pulleys 29 and 81.

The pulley housing 62 is provided with slots 106 for the mounting bolts 60, which hold the housing to the nose of the engine. By loosening the bolts 60, the housing may be moved downward whereby any slack in the belts will be taken up.

Obviously, outward swinging of the weights 99 will move the spring compressing collar 83 to the left against the resistance of the spring 85, and simultaneously, move the pulley part 79 to the right, which will increase the V diameter of the pulley 81. Since the V belt has substantially no elongation, the part 30 of the pulley 29 is forced to the right, making the V diameter of the pulley 29 smaller, whereby the one to one ratio between these pulleys is disturbed. Similarly, if the springs 85 and 31 override the weights 99, the V diameter of the pulley 29 increases when that of the pulley 81 decreases.

On the front of the propeller hub 10 and preferably integral therewith, are the usual laterally extending bosses 108 within which the shanks 110 of the propeller blades 112 have rotative bearing. Bearing brackets 114 extend laterally from each boss 108 and rotatably support the blade adjusting screw 115. A gear 118 on the rear end of the screw 115 meshes with the gear 46 on the front end of the sleeve 24. Nut 120 is internally threaded to fit the screw 115 and has a pin 122 extending from one flat side. An arm 124 extends radially from a blade shank 110, the arm being bifurcated at the outer end to straddle the pin 122. The arm 124 extends through a slot 126 in the boss 108. The gain or loss of speed of the pulley 29, with respect to the pulley 22, will rotate the screw 115 in one direction or the other, which, in turn, will rotate the blade 112 on its own axis in one direction or the other.

No detent mechanism for restraining relative rotation between the pulleys 22 and 29 is provided in this modification. Obviously, the detent mechanism shown in Fig. 1 may be readily adapted to Fig. 5.

Figures 7, 8:
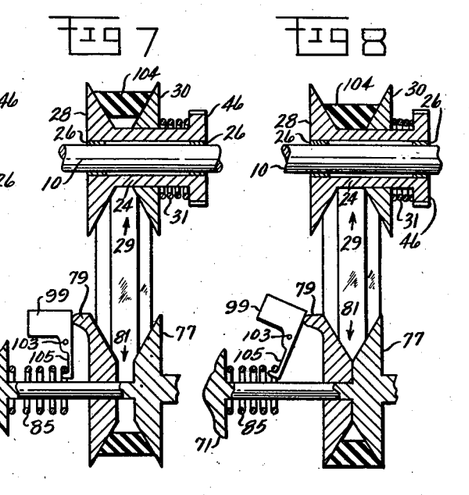
Fig. 7 is a schematic view of certain parts of the mechanism of Fig. 5 showing the condition of the parts when the propeller is "on speed,"
Fig. 8 is a schematic view of certain parts of the mechanism of Fig. 5 showing the condition of the parts when the propeller is overspeed.

The modification shown in Fig. 5 operates substantially as follows:

Assume, again, to facilitate description, that all four of the pulleys 22, 71, 81, and 29 are of equal diameter measured over the V track when the weights 99 have swung to the intermediate position shown in Figs. 5 and 7. In this position, there should again be a one to one ratio between pulleys 22 and 29 when pulley 29 is being driven by pulley 22 through the belts 102 and 104, and the pulleys 71 and 81.

The revolution speed at which the weights 99 will reach their intermediate position, Figs. 5 and 7, will depend on the combined stress of springs 31 and 85. In Fig. 5, these springs, at the position shown, are substantially midway between their greatest and their least stresses. It may be assumed, for purposes of description only, that propeller shaft rotation is in the direction of the arrow 132, and that the weights 99 and the springs 85 and 31 are in such proportion that the weights will have moved outward to the position shown in Figs. 5 and 7 at a preselected R. P. M. of the propeller shaft 12. If, for any reason, the load on the blades 112 now decreases, the propeller speed will increase above the preselected R. P. M.. Responding to this increase in propeller speed, the weights 99 will first swing outward toward the position shown in Fig. 8, which will enlarge the pulley 81 and compel the pulley part 30 to move to the right against the resistance of the spring 31, to proportionately decrease the V diameter of the pulley 29. This change in the pulley diameters will raise the speed of the pulley 29 above that of the pulley 22, whereby the rotation of the pulley 29 relative to the pulley 22 is in the same direction as the arrow 132. This will rotate the screw 115 in the direction of the arrow 135. The screw, being right hand, will rotate the blade 112 in the direction of the arrow 136, which increases the blade pitch and brings the propeller and pulley 22 back down to speed. The resulting decrease in speed of the pulleys 22, 71, and 81 brings the weights 99 back from an overspeed condition similar to that shown in Fig. 8 to their normal position of Figs. 5 and 7.

Figure 6:
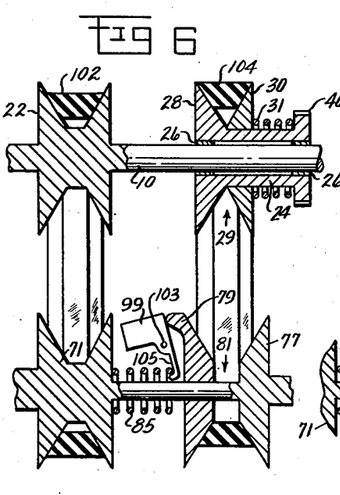
Fig. 6 is a schematic view of certain parts of mechanism of Fig. 5 showing the condition of the parts when the propeller is underspeed.

On the other hand, if the load on the blades 112 increases, the propeller speed, and that of the pulley 22 with it, will decrease, the speed of the pulley 81 and weights 99 will at first decrease with the propeller, but the lowering of the speed of the weights 99, which moves them in a direction approaching the position shown in Fig. 6, will move the part 79 in a direction to reduce the diameter of the pulley 81, whereupon the pulley 29 will rotate slower than the pulley 22 and this difference in speed will turn the screw 115 opposite the direction of the arrow 135, which will decrease the propeller pitch and allow the propeller to come back up to speed.

Figures 9, 11:
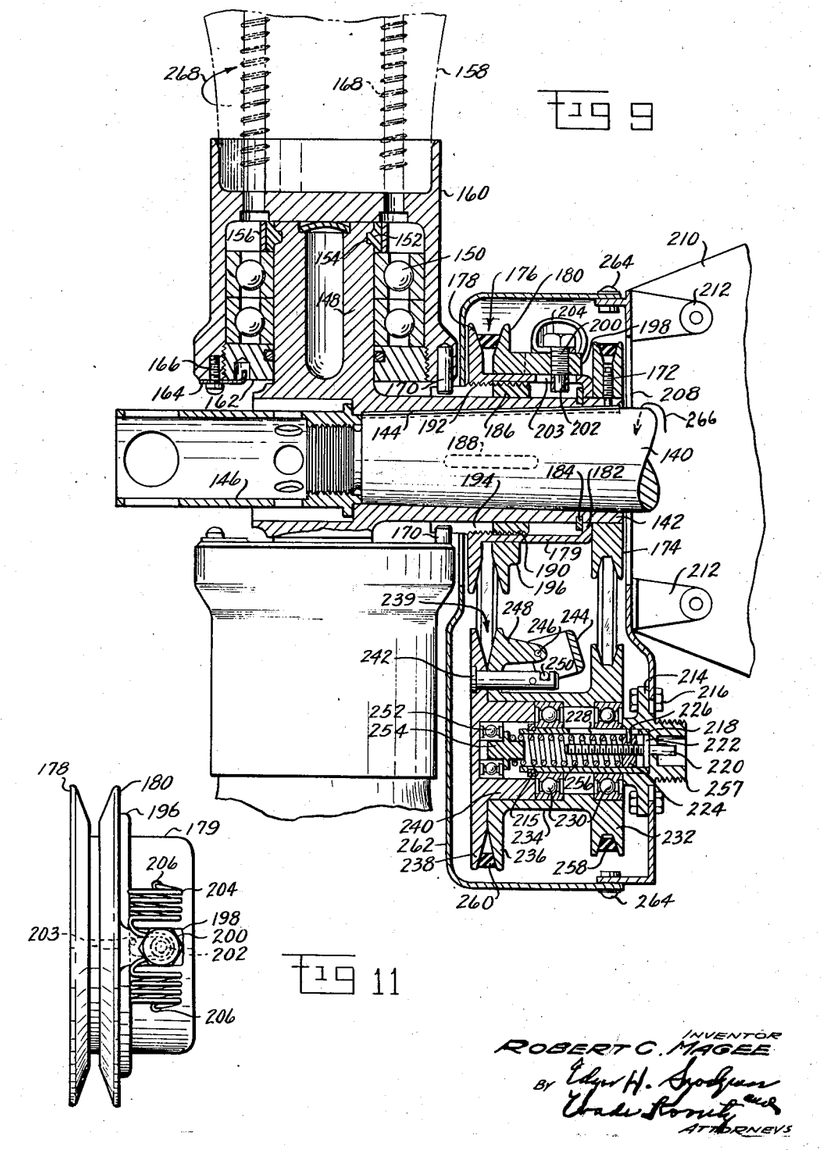
Fig. 9 shows another modification of the invention.
Fig. 11 shows one of the adjustable V belt-pulleys of the mechanism shown in Fig. 9.

In the modification, Fig. 9, the propeller shaft 140 is tapered, the propeller hub 142 being correspondingly tapered internally, the two parts being secured against relative rotation by the key 144 and against relative axial movement by the nut 146.

At the forward end, the propeller hub has oppositely extending integral bearing bosses 148 upon which the inner races of antifriction bearings 150 are carried. A split ring 152 has an annular rib 154 which extends into an annular groove in the periphery of the bearing bosses 148 and holds the inner races on the bosses. A solid ring 156 is press fitted over the split ring to hold the halves together.

The wooden blades 158 are provided at their inner ends with ferrules 160. The ferrules, at their outer ends, receive the butt ends of the blades, and, at their inner ends, are bored to receive the outer races of the bearings 150, about which the blades rotate upon their axes. A bearing retaining nut 162 is threaded into the inner end of the ferrule, and a locking clip 164 has a laterally projected end extending into the spanner holes in the nut 162 to maintain it in the adjusted position. The locking clip is held in the end of the ferrule by a screw 166. The wooden blades 158 are held in the ferrule by special wood screws 168. A pitch control pin 170 in the rim of the ferrule 160 is employed for rotating the blade about its own axis on the bearings 150.

Secured to the rear end of the propeller hub 142 by a screw 172 is a driving V pulley 174. A driven V pulley 176 is in axial alignment with the V pulley 174 and comprises two parts 178 and 180. Part 178 has a rearwardly extending hub 179 with an inturned flange 182 which is freely rotatable on the propeller hub 142, but which is held against axial movement thereon by a snap ring 184. Ring 184 is sprung into a groove in the propeller hub.

A pitch control cam sleeve 186 is freely slidable axially on the propeller hub 142, but is held against rotation with respect thereto by one or more splines or keys 188. Keys 188 are fitted tight in external keyways in the outside of the propeller hub 142 and slidably in internal keyways 189 (see Fig. 10) in the inside of the sleeve 186, whereby the sleeve 186 must rotate in unison with the propeller hub, but may move axially thereon while so rotating.

The outside of the sleeve 186 is threaded as at 190, while the pulley hub 179 is internally threaded as at 192 to fit the threads 190, whereby rotation of the pulley part 178 faster or slower than the propeller hub 142 will move the sleeve 186 axially one way or the other on the propeller hub. The threads 190 and 192 are left hand.

The forward end of the sleeve 186 is provided with diagonal camming slots 194 which receive the pitch control pins 170, whereby axial movement of the sleeve 186 on the propeller hub 142 will rotate the blades 158 on their axes.

The pulley part 180 has a rearwardly extending hub 196. Hub 196 has several circumferentially spaced apart lugs 198 extending rearwardly therefrom. Special screws 200 extend through tapped holes in the lugs 198, the screws, at their inner ends, carrying small rollers 202 which lie in elongated slots 203 in the hub 179, whereby the pulley part 180 has limited axial movement, but no rotational movement with respect to the pulley part 178. Special springs 204 are fastened by the heads of the screws 200 to the lugs 198 (see Fig. 11). The springs 204, at their midportion, loop around the screws 200 and have several convolutions at each side of the lugs 198, the outer ends of the spring being inserted in holes 206 in the hub 179, whereby the pulley part 180 is constantly urged toward the pulley part 178. Pulleys 174 and 176 being coaxial, and both on the propeller hub, may be referred to as the propeller hub pulleys.

A mounting plate 208 is secured to the nose of the engine 210 by fastening means 212. Near the lower end of the plate, a flanged hub 214 is secured by bolts 216. The flanged hub extends through an oversize hole in the mounting plate whereby the position of the hub with respect to the plate may be changed to a limited degree when the bolts are loosened.

A hollow stud 218 is press fitted, and preferably, further secured by welding, in the hub 214. A speed-adjusting screw 220 has a flange 222 which rests against a shoulder in the hub 214. A nut 224, internally threaded for the screw 220, is held against rotation by a pin 226 which extends into an elongated slot 228 in the hollow stud 218, whereby turning the screw 220 moves the nut 224 axially along the screw.

The inner races of two antifriction bearings 230 are supported on the hollow stud 218, one resting against a shoulder on the hub 214 and the other against a snap ring 215 sprung into an annular groove in the stud.

A V belt-pulley 232 has a forwardly extending sleeve or hollow shaft 234, which has an integral, or otherwise drivably secured, pulley part 236. The parts 232, 234 and 236 are rotatably supported on the outer races of the bearings 230.

Another pulley part 238 has a hub 240 which is slidable in the bore of the hub 234. Studs 242, tight in the part 238 and loose in the part 236 permits axial movement between these parts but prevent relative rotation therebetween. The parts 236 and 238 together form a V pulley which may be designated by the numeral 239.

Since the pulleys 232 and 239 are both on the hollow shaft 234, which is rotatable on bearings 230, they may properly be referred to as the countershaft pulleys.

Centrifugal weights 244 are hinged by the pins 246 to ears 248 on the pulley part 236. Pins 250 extend from the sides of the weights 244 and lie in grooves which extend transversely through the studs 242, whereby outward swinging of the weights moves the pulley part 238 axially to the right with respect to the pulley part 236, whereby the V diameter of the pulley 239 is increased.

The inside of the hub 240 is bored to receive the outer race of a small antifriction bearing 252, the inner race being provided with a plug 254 against which the one end of a coil spring 256 bears, the other end of the spring resting against the nut 224. Expansion of the spring 256 moves the pulley part 238 to the left and draws the centrifugal weights 244 inward. Increasing the stress of the spring 256 by means of the screw 220 raises the speed at which the weights 244 will swing outward. The screw 220 may preferably be remotely controlled by a flexible shaft or similar means, the casing of which may be screwed onto the threaded hub 257.

A V belt 258 encircles the pulleys 174 and 232, and another V belt 260 encircles the pulleys 176 and 239. A dust cover 262 encloses the belt and pulley mechanism, the cover being held to the mounting plate 208 by screws 264. The operation of the modification shown in Fig. 9 is substantially as follows.

Assume that propeller rotation is in the direction of the arrow 266. When, for any reason, the propeller is overspeed for the then adjusted position of the spring 256, the weights 244 move to the "out" position, shown in the drawings which raises the V diameter of the pulley 239 and draws the pulley 176 to a smaller diameter.

Since the pulley 176 now rotates faster than the propeller hub 142, and since the sleeve 186 with which the pulley 176 is threadedly engaged may move axially, the sleeve, which is threaded left hand, will be screwed forward by the threaded interior of the pulley hub 179, which will cause the diagonal cam slots 194 to turn the blades 158 in the direction of the arrow 268 to increase the pitch, whereby the propeller speed is lowered and the weights 244 will assume an intermediate position. Obviously, when, due to an underspeed of the propeller, the weights move to the "in" position, the blades will be turned in a direction opposite the arrow 268 and the pitch will thereby be decreased. The propeller speed at which the weights 244 will assume the intermediate or normal position, may be varied by adjusting the screw 220 as in previously described modifications.

While in all of the several embodiments herein shown, the free pulley on the propeller hub is the one which has an adjustable belt track, it should be understood that the device will operate with equal facility if the tight pulley on the propeller hub is made with an adjustable belt track and the free pulley is non-adjustable.

And while in all of the several embodiments shown there is a countershaft, and the drive from the tight to the free pulley on the propeller hub is through one belt to a pulley on the countershaft, then from a second pulley on the countershaft back to the free pulley on the hub, it should be understood that the countershaft may be eliminated entirely within the spirit of the invention if a single belt extends around the tight propeller hub pulley, over a spaced apart idler pulley with axis preferably normal to the propeller hub axis, over the free propeller hub pulley, over another similar idler pulley and back to the tight propeller hub pulley. In this latter conception of the invention, either one or both of the propeller hub pulleys may have an adjustable belt track.

Having thus described the invention, I claim:

1. Pitch control mechanism for a variable pitch propeller which has a propeller shaft, a propeller hub fast on said shaft, a laterally extending bearing boss integral with said hub, and a propeller blade having rotative bearing in said boss, said mechanism comprising, in combination, an arm extending laterally from said blade, a blade adjusting screw having its axis parallel to the propeller shaft axis, bearings for said blade adjusting screw carried on said boss, a nut on said screw, means for connecting said nut to said arm, whereby rotation of said screw adjusts the pitch of said blade, a non-adjustable V belt-pulley fast on said hub for synchronous rotation therewith, an adjustable V belt-pulley freely rotatable on said hub, a centrifugal weight carried by the adjustable V belt-pulley structure adapted to swing outward and thereby adjust the belt track of said adjustable V belt-pulley to its maximum diameter, gearing drivably connecting said adjustable V belt-pulley to said blade adjusting screw, screw threads formed on the propeller hub, a nut on said screw threads, a key extending from said nut, shoulder means on said adjustable propeller-hub pulley engageable by said key to adjust said pulley to normal diameter after a predetermined blade angle has been reached, a countershaft spaced apart from, but axially parallel to, said propeller shaft, a non-adjustable V belt-pulley and an adjustable V belt-pulley on said countershaft connected together for unitary rotation, a V belt encircling the adjustable propeller hub pulley and the adjustable countershaft pulley, a V belt encircling the non-adjustable propeller hub pulley and the non-adjustable countershaft pulley, spring means under stress urging the adjustable countershaft pulley to assume maximum belt-track diameter, and manual means for varying the stress of said spring.

2. Pitch changing mechanism for a variable pitch propeller which has a propeller shaft, a propeller hub fast on said shaft, a laterally extending bearing boss integral with said hub, and a propeller blade having rotative bearing in said boss, said mechanism comprising, in combination, an arm extending laterally from said blade, a blade-adjusting screw having its axis parallel to the propeller shaft axis, bearings for said blade-adjusting screw carried on said boss, a nut on said screw, means for connecting said nut to said arm, whereby rotation of said screw adjusts the pitch of said blade, a non-adjustable V belt-pulley fast on said hub for synchronous rotation therewith, an adjustable V belt-pulley freely rotatable on said hub, detent means yieldably restraining relative rotation between said non-adjustable and said adjustable V belt-pulleys, a centrifugal weight carried by the adjustable V belt-pulley structure adapted to swing outward and thereby adjust the belt track of said adjustable V belt-pulley to its maximum diameter, gearing drivably connecting said adjustable V belt-pulley to said blade-adjusting screw, a countershaft spaced apart from, but axially parallel to, said propeller shaft, a non-adjustable V belt-pulley and an adjustable V belt-pulley on said countershaft connected together for unitary rotation, a V belt encircling the adjustable propeller hub pulley and the adjustable countershaft pulley, a V belt encircling the non-adjustable propeller hub pulley and the non-adjustable countershaft pulley, spring means under stress urging the adjustable countershaft pulley to assume its maximum belt track diameter, and manual means for varying the stress of said spring.

3. For use on a variable pitch propeller which has a propeller shaft, a propeller hub fast on said shaft, a laterally extending bearing support carried by said hub, and a propeller blade having rotative bearing in said support, improvements comprising, in combination, an arm extending laterally from said blade, a blade-adjusting screw having its axis parallel to the propeller shaft axis, bearings for said blade-adjusting screw carried on said support, a nut on said screw, means for connecting said nut to said arm, whereby rotation of said screw adjusts the pitch of said blade, a non-adjustable belt-pulley fast on said hub for synchronous rotation therewith, an adjustable belt-pulley freely rotatable on said hub, a centrifugal weight carried by the adjustable belt-pulley structure adapted to swing outward and thereby adjust the belt track of said adjustable belt-pulley to its maximum diameter, gearing drivably connecting said adjustable belt-pulley to said blade-adjusting screw, a countershaft spaced apart from, but axially parallel to, said propeller shaft, a non-adjustable belt-pulley and an adjustable belt-pulley on said countershaft connected together for unitary rotation, a belt encircling the adjustable propeller hub pulley and the adjustable countershaft pulley, a belt encircling the non-adjustable propeller hub pulley and the non-adjustable countershaft pulley, spring means under stress urging the adjustable countershaft pulley to assume its maximum belt track diameter, and manual means for varying the stress of said spring.

4. For use in conjunction with a variable pitch propeller which has a propeller shaft, a propeller hub fast on said shaft, a laterally extending bearing support carried by said hub, and a propeller blade having rotative bearing in said support, pitch change mechanism comprising an arm extending laterally from said blade, a blade-adjusting screw having its axis parallel to the propeller shaft axis, bearings for said blade-adjusting screw carried on said support, a nut on said screw, means for connecting said nut to said arm, whereby rotation of said screw adjusts the pitch of said blade, a non-adjustable belt-pulley fast on said hub for synchronous rotation therewith, an adjustable belt-pulley freely rotatable on said hub, a centrifugal weight carried by the adjustable belt-pulley structure adapted to swing outward and thereby adjust the belt track of said adjustable belt-pulley to its maximum diameter, speed-reducing power transmitting means drivably connecting said adjustable belt-pulley to said blade-adjusting screw, a countershaft spaced apart from said propeller shaft, a non-adjustable belt-pulley and an adjustable belt-pulley on said countershaft connected together for unitary rotation, a belt encircling the adjustable propeller hub pulley and the adjustable countershaft pulley, a belt encircling the non-adjustable propeller hub pulley and the non-adjustable countershaft pulley, resilient means under stress urging the adjustable countershaft pulley to assume its maximum belt track diameter, and manual means for varying the stress of said resilient means.

5. For a variable pitch propeller comprising a propeller hub, a laterally extending bearing support carried by said hub, and a propeller blade rotatable about its axis in said support, the improved pitch change mechanism which comprises, in combination, a non-adjustable belt-pulley fast on said hub for synchronous rotation therewith, an adjustable belt-pulley freely rotatable on said hub, a centrifugal weight carried by the adjustable belt-pulley structure adapted to swing outward and thereby adjust the belt track of said adjustable best-pulley to its maximum diameter, power transmitting means drivably connecting said adjustable belt-pulley to said blade for rotating said blade about its axis, a countershaft spaced apart from said propeller hub, a non-adjustable belt-pulley and an adjustable belt-pulley on said countershaft connected together for unitary rotation, a belt encircling the adjustable propeller hub pulley and the adjustable countershaft pulley, a belt encircling the non-adjustable propeller hub pulley and the non-adjustable countershaft pulley, resilient means under stress urging the adjustable countershaft pulley to assume its maximum belt track diameter, and manual means for varying the stress of said resilient means.

6. Improved operating means for a variable pitch propeller having a propeller hub, a laterally extending bearing support carried by said hub, and a propeller blade rotatable on its axis in said support, said operating means comprising, in combination, a countershaft spaced apart from said hub, a pair of axially aligned belt-pulleys on the propeller hub, one fastened thereto for unitary rotation therewith and the other free to rotate thereon, a pair of axially aligned belt-pulleys on the countershaft secured together for unitary rotation, one pulley of each said pair having a belt track which is adjustable to different diameters, the other pulleys being non-adjustable, a belt encircling the non-adjustable pulleys, a belt encircling the adjustable pulleys, a resilient means urging the adjustable countershaft pulley to assume its maximum belt track diameter, a centrifugal means operative upon a rise in speed to urge said adjustable propeller hub pulley to assume its maximum belt track diameter, and power transmitting means connecting said free propeller hub pulley to the propeller blade.

7. For a variable pitch propeller comprising a propeller hub, a lateraly extending bearing support carried by said hub, and a propeller blade rotatable on its axis in said support, p'tch adjusting means which consists of a belt-pulley secured to said hub for synchronous rotation therewith, a second belt-pulley freely rotatable on said hub, said second belt-pulley having a belt track which may be made larger or smaller, speed responsive means, operative upon an increase in speed to increase the diameter of the belt track of said second pulley, power transmitting means for driving the second pulley by means of the first, said power transmitting means including at least one belt, and power transmitting means for connecting the second pulley to the propeller blade.

8. For a variable pitch propeller which includes a propeller shaft, a propeller hub fast on said shaft, a radially extending bearing boss integral with said hub, and a propeller blade having rotative bearing in said boss, improvements comprising, in combination, an arm extending radially from said blade, a blade-adjusting screw having its axis parallel to the propeller shaft axis, bearings for said blade-adjusting screw carried on said boss, a nut on said screw, means for connecting said nut to said arm whereby rotation of said screw adjusts the pitch of said blade, a non-adjustable V belt-pulley fast on said hub for synchronous rotation therewith, an adjustable V belt-pulley freely rotatable on said hub, spring means urging said adjustable V belt-pulley to assume its largest belt track diameter, gearing drivably connecting said adjustable V belt-pulley to said blade-adjusting screw, a countershaft spaced apart from, but axially parallel to, said propeller shaft, a non-adjustable V belt-pulley and an adjustable V belt-pulley on said countershaft connected together for unitary rotation, centrifugal weights carried on and rotatable by the countershaft structure, adapted upon outward movement to increase the belt track diameter of the adjustable V belt-pulley, a V belt encircling the non-adjustable propeller shaft pulley and the non-adjustable countershaft pulley, a V belt encircling the adjustable propeller shaft pulley and the adjustable countershaft pulley, a spring to urge said weights inward, and manual means to vary the stress of said spring.

9. For a variable pitch propeller having a propeller shaft, a propeller hub fast on said shaft, a radially extending bearing support carried by said hub, and a propeller blade having rotative bearing in said support, blade adjusting means comprising an arm extending radially from said blade, a blade-adjusting screw having its axis parallel to the propeller shaft axis, bearings for said blade-adjusting screw carried on said support, a nut on said screw, means for connecting said nut to said arm whereby rotation of said screw adjusts the pitch of said blade, a non-adjustable belt-pulley fast on said hub for synchronous rotation therewith, an adjustable belt-pulley freely rotatable on said hub, spring means urging said adjustable belt-pulley to assume its largest belt track diameter, gearing drivably connecting said adjustable belt-pulley to said blade-adjusting screw, a countershaft, a non-adjustable belt-pulley and an adjustable belt-pulley on said countershaft connected together for unitary rotation, centrifugal weights carried on and rotatable by the countershaft and adapted upon outward movement to increase the belt track diameter of the second-named adjustable belt-pulley, a belt encircling the non-adjustable propeller hub pulley and the non-adjustable countershaft pulley, a belt encircling the adjustable propeller hub pulley and the adjustable countershaft pulley, a spring to urge said weights inward, and manual means to vary the stress of said spring.

10. For operation in connection with a variable pitch propeller having a propeller shaft, a propeller hub fast on said shaft, a radially extending bearing support carried by said hub, and a propeller blade having rotative bearing in said support, blade adjusting means comprising, in combination, an arm extending radially from said blade, a blade-adjusting screw having its axis parallel to the propeller shaft axis, bearings for said blade-adjusting screw carried on said support, a nut on said screw, means for connecting said nut to said arm whereby rotation of said screw adjusts the pitch of said blade, a non-adjustable belt-pulley fast on said hub for synchronous rotation therewith, an adjustable belt-pulley freely rotatable on said hub, resilient means urging said adjustable belt-pulley to assume its largest belt track diameter, speed reducing power transmitting means drivably connecting said adjustable belt-pulley to said blade adjusting screw, a countershaft spaced apart from, but axially parallel to, said propeller shaft, a non-adjustable belt-pulley and an adjustable belt-pulley on said countershaft connected together for unitary rotation, centrifugal weights carried on and rotatable by the countershaft structure, adapted upon outward movement to increase the belt track diameter of the adjustable belt-pulley, a belt encircling the non-adjustable propeller hub pulley and the non-adjustable countershaft pulley, a belt encircling the adjustable propeller hub pulley and the adjustable countershaft pulley, resilient means to urge said weights inward, and manual means to vary the stress of said resilient means.

11. For use on a variable pitch propeller having a propeller hub, a laterally extending bearing support carried by said hub, and a propeller blade rotatable about its axis in said support, the improvement which comprises, in combination, a non-adjustable belt-pulley fast on said hub for synchronous rotation therewith, an adjustable belt-pulley freely rotatable on said hub, resilient means urging said adjustable belt-pulley to assume its largest belt track diameter, power transmitting means drivably connecting said adjustable belt-pulley to said blade for rotating said blade about its axis, a countershaft spaced apart from said propeller hub, a non-adjustable belt-pulley and an adjustable belt-pulley on said countershaft connected together for unitary rotation, a centrifugal weight carried on and rotatable by the countershaft structure, adapted upon outward movement to increase the diameter of the belt track of the adjustable belt-pulley, a belt encircling the non-adjustable propeller hub pulley and the non-adjustable countershaft pulley, a belt encircling the adjustable propeller hub pulley and the adjustable countershaft pulley, resilient means to urge said weights inward, and manual means to vary the stress of said resilient means.

12. For use in conjunction with a variable pitch propeller comprising a propeller hub, a laterally extending bearing support carried by said hub, and a propeller blade rotatable on its axis in said support, improved operating means which consists of a countershaft spaced apart from said hub, a pair of axially aligned belt-pulleys on the propeller hub, one fastened thereto for unitary rotation therewith and the other free to rotate thereon, a pair of axially aligned belt-pulleys on the countershaft secured together for unitary rotation, one pulley of each said pair having a belt track which is adjustable to different diameters, the other pulleys being non-adjustable, a belt encircling the non-adjustable pulleys, a belt encircling the adjustable pulleys, a resilient means urging the adjustable propeller hub pulley to assume its maximum belt track diameter, a centrifugal means operative upon a rise in speed to urge said adjustable countershaft pulley to assume its maximum belt track diameter, and power transmitting means connecting said free propeller hub pulley to the propeller blade.

13. Mechanism for use on a variable pitch propeller, said propeller having a propeller hub, a laterally extending bearing support carried by said hub, and a propeller blade rotatable on its axis in said support, said mechanism comprising a belt-pulley secured to said hub for synchronous rotation therewith, a second belt-pulley freely rotatable on said hub, said second belt-pulley having a belt track which may be made larger or smaller, power transmitting means for driving the second pulley by the first, said power transmitting means including a belt and a speed responsive means operative upon an increase in speed to decrease the belt-track diameter of the said second pulley, and power transmitting means for connecting the said second pulley to the propeller blade.

14. For use on a variable pitch propeller comprising a propeller shaft, a propeller hub fast on said shaft, oppositely extending bearing bosses integral with said hub, and propeller blade bearings on said bosses, the improvement which consists of propeller blade ferrules rotatable on said bearings, blade rotating pins at the outer edges of the ferrules having axes parallel to the blade axis, a pitch-control cam sleeve slidable axially on said hub, spline means drivably connecting said sleeve and hub, said sleeve having screw threads on its outer diameter and diagonal cam slots for receiving said pins, whereby axial movement of said cam-sleeve rotates said blades about their axes, a non-adjustable V belt-pulley fast on said hub for unitary rotation therewith, an adjustable V belt-pulley freely rotatable on said hub but secured against axial movement thereon, spring means urging said adjustable V belt-pulley to assume its largest belt track diameter, screw threads on the inside of said adjustable V belt-pulley in threaded engagement with the screw threads on said cam sleeve, a countershaft spaced apart from, but axially parallel to, said propeller shaft, a non-adjustable and an adjustable V belt-pulley on said countershaft connected for unitary rotation, centrifugal weights carried on and rotatable by the countershaft structure, adapted upon outward movement to increase the belt track diameter of the adjustable V belt-pulley on the countershaft, a V belt encircling the non-adjustable propeller shaft pulley and the non-adjustable countershaft pulley, a V belt encircling the adjustable propeller shaft pulley and the adjustable countershaft pulley, a spring under stress positioned to urge said adjustable V belt-pulley on the countershaft to assume its minimum belt track diameter and to urge said weights inward, and manual means to adjust said spring.

15. Operating means for a variable pitch propeller which has a propeller shaft, a propeller hub fast on said shaft, oppositely extending bearing supports carried on said hub, and propeller blade bearings on said supports, said operating means comprising propeller blade ferrules rotatable on said bearings, blade rotating pins at the outer edges of the ferrules having axes parallel to the blade axis, a pitch-control cam-sleeve slidable axially on said hub, spline means drivably connecting said sleeve and hub, said sleeve having screw threads on its outer diameter and diagonal cam slots for receiving said pins, whereby axial movement of said cam sleeve rotates said blades about their axes, a non-adjustable belt-pulley fast on said hub for unitary rotation therewith, an adjustable belt-pulley freely rotatable on said hub but secured against axial movement thereon, spring means urging said adjustable belt-pulley to its largest belt track diameter, screw threads on the inside of said adjustable belt-pulley in threaded engagement with the screw threads on said cam sleeve, a countershaft spaced apart from, but axially parallel to, said propeller shaft, a non-adjustable and an adjustable belt-pulley on said countershaft connected for unitary rotation, centrifugal weights carried on and rotatable by the countershaft structure, adapted upon outward movement to increase the belt track diameter of the adjustable belt-pulley, a belt encircling the non-adjustable propeller shaft pulley and the non-adjustable countershaft pulley, a belt encircling the adjustable propeller shaft pulley and the adjustable countershaft pulley, a spring under stress positioned to urge said adjustable belt-pulley to its minimum belt track diameter and to urge said weights inward, and means to adjust said springs.

16. In combination with a variable pitch propeller comprising a propeller hub, oppositely extending bearing supports carried on said hub, propeller blade bearings on said supports, and propeller blade ferrules rotatable on said bearings, the improvement which consists of blade rotating pins at the outer edges of the ferrules, said pins having axes parallel to the blade axis, a pitch-control cam-sleeve slidable axially on said hub and having diagonal cam slots to receive said pins, spline means drivably connecting said sleeve and hub, whereby axial movement of said cam sleeve rotates said blades about their axes, a non-adjustable belt-pulley fast on said hub for unitary rotation therewith, an adjustable belt-pulley freely rotatable on said hub but secured against axial movement thereon, spring means urging said adjustable belt-pulley to its largest belt track diameter, cooperating means on said adjustable belt-pulley and said cam sleeve, whereby rotation of said adjustable belt pulley, with respect to said hub, moves said cam sleeve axially, a countershaft spaced apart from, but axially parallel to, said propeller shaft, a non-adjustable and an adjustable belt-pulley on said countershaft connected for unitary rotation, centrifugal weights carried on and rotatable by the countershaft structure, adapted upon outward movement to increase the belt track diameter of the adjustable belt-pulley, a belt encircling the non-adjustable propeller shaft pulley and the non-adjustable countershaft pulley, a belt encircling the adjustable propeller shaft pulley and the adjustable countershaft pulley, a spring under stress positioned to urge said adjustable belt-pulley to its minimum belt track diameter and to urge said weights inward, and means to adjust said spring.

17. In a variable pitch propeller comprising a propeller hub, oppositely extending bearing supports carried on said hub, propeller blade bearings on said supports, and propeller blades having shanks rotatable on said bearings, the combination with blade rotating pins at the outer edges of the shanks and pins having axes parallel to the blade axis, a pitch-control cam sleeve slidable axially on said hub and having diagonal cam slots to secure said pins, spline means drivably connecting said sleeve and hub, whereby axial movement of said cam sleeve rotates said blades about their axes, a non-adjustble belt-pulley fast on said hub for unitary rotation therewith, an adjustable belt-pulley freely rotatable on said hub but secured against axial movement thereon, spring means urging said adjustable belt-pulley to its largest belt track diameter, means on said adjustable belt-pulley and cooperating means on said cam sleeve, whereby rotation of said adjustable belt pulley with respect to said hub, moves said cam sleeve axially, a countershaft spaced apart from, but axially parallel to, said propeller shaft, a non-adjustable and an adjustable belt-pulley on said countershaft connected for unitary rotation, centrifugal weights carried on and rotatable by the countershaft structure, adapted upon outward movement to increase the belt track diameter of the adjustable belt-pulley, a belt encircling the non-adjustable propeller shaft pulley and the non-adjustable countershaft pulley, a belt encircling the adjustable propeller shaft pulley and the adjustable countershaft pulley, a spring under stress positioned to urge said adjustable belt-pulley to its minimum belt track diameter and to urge said weights inward, and means to adjust said springs.

18. For adjusting the pitch of a propeller having a hub, and blades adjustable thereon for pitch variation, the improved pitch control mechanism which comprises, in combination, control means mounted to rotate relative to the hub, means drivably connecting said control means to the blades, whereby rotation of said control means varies the pitch of the blades, a countershaft, means drivably connecting said hub to said countershaft, two V belt-pulleys, one fast on said control means and one fast on countershaft, split on a plane normal to the pulley axis so that one side of the V is on each pulley part, means for holding one only of the parts of each pulley against axial movement, the other part being axially movable, a V belt encircling said pulleys, and a speed responsive means operative upon a change in propeller speed to move the movable parts of the pulleys axially, one away from and the other toward the axially immovable parts.

19. The pitch control mechanism defined in claim 18 with means to selectively control the speed at which the speed responsive means becomes effective.

20. The pitch control mechanism defined in claim 18 with means to move the countershaft to loosen or tighten the belt.

21. The pitch control mechanism defined in claim 18 with means to limit the number of times which the control means may rotate relative to the propeller hub, whereby the degree of pitch change is limited.

22. In a speed-control mechanism, the combination with a driving shaft, and a driven member adjustable thereon to vary the load, of a sleeve mounted for relative rotation with respect to the driving shaft and operatively connected to the driven member, a split-pulley having a tapering groove and one member of which is fixed to the sleeve and the other member slidable along the sleeve to vary the width of the groove, and a second pulley similar to and belted to the first pulley and driven from the driving shaft, one of the pulleys having means constantly urging its two members together and the other pulley having a fly-weight constantly urging its two members together, whereby the centrifugal force of the fly-weight will act in opposition to said means and cause relative rotation of the sleeve and driving shaft whenever those two forces are not in equilibrium.

23. In a speed-control mechanism for a propeller or the like, the combintion with the hub, and blades adjustable thereon for pitch variation, of a sleeve mounted for relative rotation with respect ot the hub and geared to the blades, a V-grooved split-pulley of which one member is fixed to the sleeve and the other slidable along the sleeve to vary the width of the groove, a countershaft driven from the hub, a second V-grooved split-pulley of which one member is fixed to the countershaft and the other slidable along the countershaft to vary the width of the groove, a V-belt connecting the two split-pulleys, and a spring and a fly-weight operatively related respectively to the slidable members of the pulleys so as to urge them constantly toward their associated fixed members, whereby the centrifugal force of the fly-weight will act in opposition to the compressive force of the spring and cause relative rotation of the sleeve and hub whenever those two forces are not in equilibrium.

24. The mechanism claimed in claim 23, in combination with means to adjust the position of the countershaft in relation to the hub to take up any slack that should develop in the belt.

25. The mechanism claimed in claim 23, in combination with means to adjust the tension of the spring and thereby set the mechanism for the constant speed desired.

26. The mechanism claimed in claim 23, in combination with means responsive to the continued action of the sleeve after the pitch of the blades has reached its maximum or minimum, for returning the movable members of the split-pulleys to their neutral positions.

27. The mechanism claimed in claim 23, in combination with a brake interposed between the sleeve and hub to prevent their relative rotation by the action of the blades alone in the event of belt failure, but insufficient to prevent such rotation through the normal action of the belt.

28. For use on a variable pitch propeller of the class having a propeller hub, laterally extending bearing supports rotatable with said hub, bearings carried by said supports, and propeller blades rotatable about their axes on said bearings, the improved pitch changing mechanism which comprises, in combination, two belt pulleys, one fast on said hub and the other free thereon, at least one of said pulleys having a belt track which may be made larger or smaller, speed responsive means, operative upon a change in speed, to change the diameter of one of said pulleys, belt means for driving the free pulley by the fast pulley, and power transmitting means connecting the free pulley to the blade for rotating said blade about its axis.

29. In a speed control mechanism for an aeroplane engine, the combination with the propeller shaft and blades mounted for pitch variation thereon, of a pair of split-pulleys belted together and provided with speed responsive means to vary their effective diameters, one of said pulleys having a fixed operative connection with the shaft so as to be rotated always at the same function of the speed of the shaft, and the other pulley being free of the shaft so as to be capable of rotating at different speeds in relation to the speed of the shaft, and an operative connection between the latter pulley and the blades for changing the pitch of the blades.

ROBERT C. MAGEE.